B. G. LAMME.
UNIVERSAL MOTOR.
APPLICATION FILED JULY 30, 1914.

1,244,510.

Patented Oct. 30, 1917.

WITNESSES:

INVENTOR
Benjamin G. Lamme.
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

UNIVERSAL MOTOR.

1,244,510.      Specification of Letters Patent.      Patented Oct. 30, 1917.

Application filed July 30, 1914. Serial No. 854,040.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Universal Motors, of which the following is a specification.

My invention relates to alternating current electric motors of the so called "universal" type which are adapted to operate at substantially the same speed and power output whether supplied with direct current or with alternating current of the rated voltage.

The object of my invention is to provide simple and effective means for automatically adjusting the field strength of the motor in accordance with the character of the current supplied thereto.

Substantially all universal motors are of the series-wound, commutating type. When a motor of this character, rated, for example, at 110 volts, is operated by direct current, there may be a drop of substantially 10 volts in the field and 100 volts in the armature, and a certain definite speed will be obtained. When the same motor is placed on a 110 volt alternating current circuit there may be a drop of, for example, 60 volts in the field and about 90 volts in the armature, because of the fact that the field winding is opposing its alternating current reactance as well as its ohmic resistance to the flow of current therethrough. As a result, the machine operates at a much lower speed, owing to the reduction in armature voltage. In order to render the speed substantially the same on alternating current that it is on direct current, it becomes necessary to weaken the field, and this is most effectively done by decreasing the number of turns in the field winding, incidentally reducing the reactance thereof. By my invention I may perform this operation automatically in any one of a number of ways, all of which are simple and effective.

Figure 1:
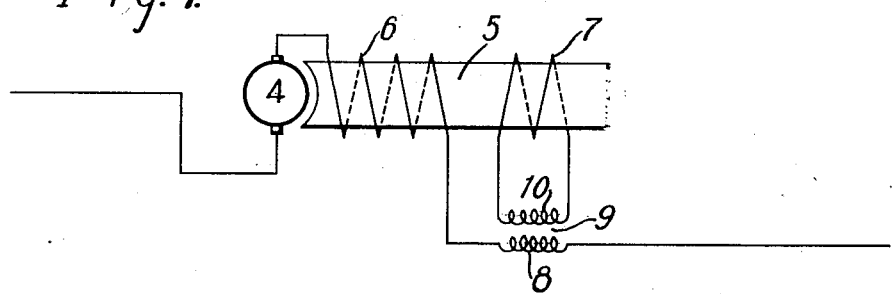
Figure 2:
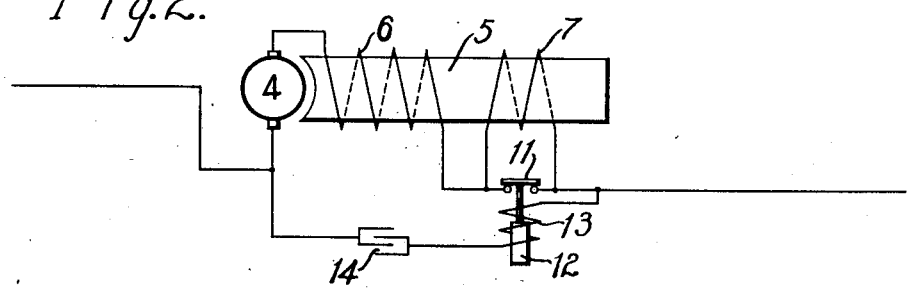

Referring to the accompanying drawing, Figure 1 is a diagrammatic view of a universal motor embodying my invention; and Fig. 2 is a diagrammatic view of a modification thereof.

Referring to the form of my invention shown in Fig. 1, 4 is the armature of a universal motor provided with a suitable field core 5 upon which are placed two field windings 6 and 7. The field winding 6 is connected in series with the armature 4 and also in series with the primary winding 8 of a transformer 9, the secondary winding 10 of which is connected to the field winding 7. When the motor is supplied with direct current, there will be no current induced in the secondary winding 10 and, therefore, the field winding 7 will not be energized and a field of the desired strength will be produced by the field winding 6. When, on the other hand, the motor is supplied with alternating current, induction will take place through the transformer 9, and the field winding 7 will be energized. The connections are such that the flux produced by the field winding 7 at all times opposes that produced by the field winding 6. As a result, neutralization of a portion of the flux of the winding 6 will take place and the resultant field will be of comparatively small strength, as desired for alternating-current operation.

Referring to the form of my invention shown in Fig. 2, the portion 7 of the field winding is shunted by a switch member 11 actuated by the core 12 of a solenoid 13 connected in shunt relation to the entire motor through a condenser 14. The switch device 11 is normally biased to the closed position by gravity or by other means. When the motor is supplied with direct current, the solenoid 13 will not be energized because of the inability of direct current to traverse the condenser 14. As a result, the switch device 11 will maintain a low-resistance shunt path around the winding 7, causing this winding to be deënergized and allowing the winding 6 to be energized to the full extent, providing a strong field for the armature 4. When, on the other hand, the motor is supplied with alternating current, a portion thereof will flow through the solenoid 13 and the condenser 14, causing the core 12 to be drawn up and moving the switch device 11 to the open position. As a result, the load current of the motor is forced to traverse the field winding 7 and, since the field winding 7 is reversely wound with respect to the field winding 6, it will neutralize a portion of the flux of the latter, resulting in a comparatively weak field for the armature 4, as is desired for alternating current operation.

While I have shown my invention in two distinct modifications, it is obviously susceptible of many changes and alterations without departing from the principle and spirit thereof. I therefore desire that only such restrictions be placed thereupon as are set forth in the appended claims.

I claim as my invention:

1. The combination with an electric motor of the universal type provided with a main field winding, of an auxiliary field winding mounted on the same core therewith, and a transformer so connected that when the motor is supplied with direct current, said auxiliary winding is not energized and whereby, when the motor is supplied with alternating current, said auxiliary winding is so energized that the flux thereof at all times opposes the flux of the main field winding.

2. The combination with an electric motor provided with a main field winding, of an auxiliary field winding mounted on the same core therewith, and transformer means for energizing said auxiliary winding from the motor supply circuit so that the flux thereof opposes the flux of the main field winding, said means being responsive to alternating current and unresponsive to direct current.

3. The combination with an electric motor of the universal type provided with a main field winding, of an auxiliary field winding mounted on the same core therewith, a series transformer, connections from the primary winding of the transformer to the supply circuit of the motor, and connections from the secondary winding of the transformer to said auxiliary winding, whereby, when the motor is supplied with direct current, said transformer will be inactive and, when the motor is supplied with alternating current, said transformer is energized to excite said auxiliary winding and cause the flux produced thereby to oppose the flux generated by the main field winding.

4. The combination with an electric motor provided with a main field winding and with an auxiliary field winding in line therewith, of a current transformer connected to energize said auxiliary winding in opposition to said main field winding and having its primary winding connected in series relation to said motor.

In testimony whereof, I have hereunto subscribed my name this 24th day of July, 1914.

BENJ. G. LAMME.

Witnesses:
  E. LIVINGSTONE,
  B. B. HINES.